Dec. 31, 1940.  R. W. SIMPSON  2,226,950
FLOWER HOLDER
Filed Jan. 13, 1938
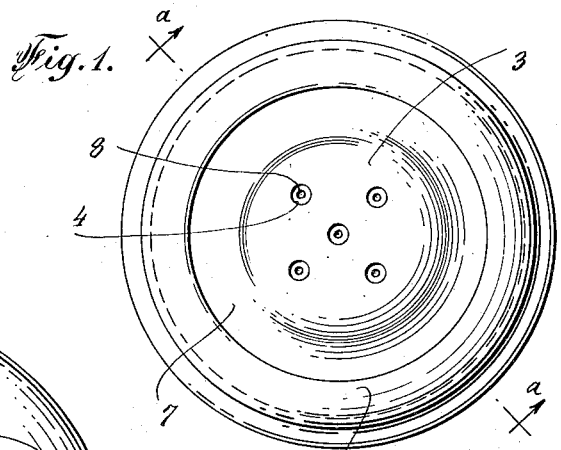
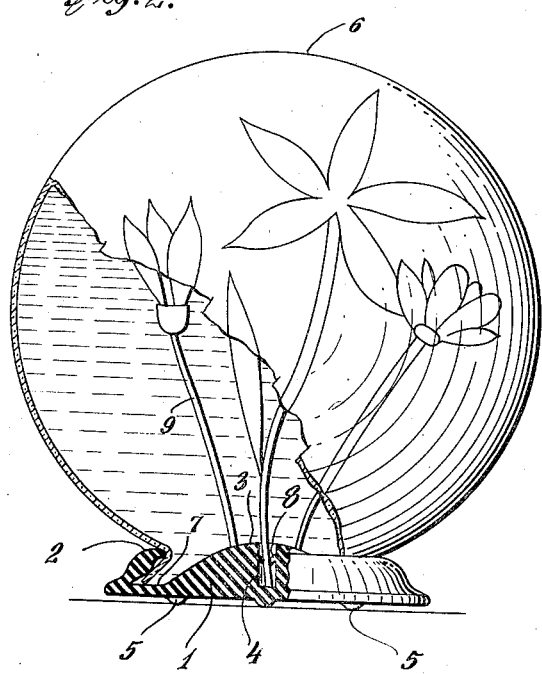
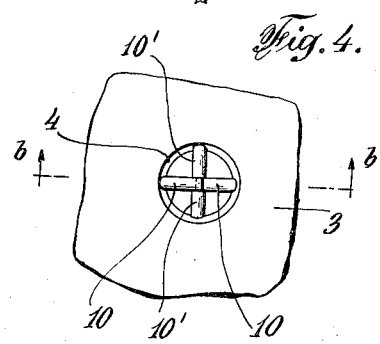
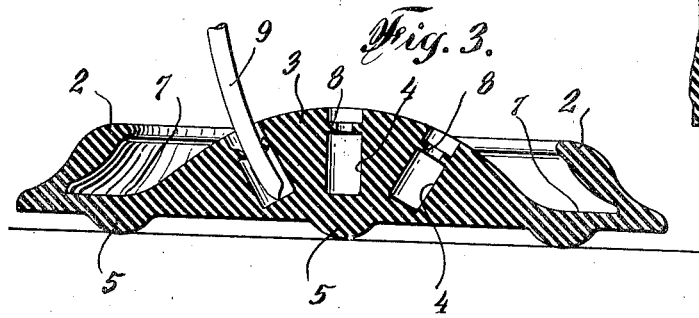
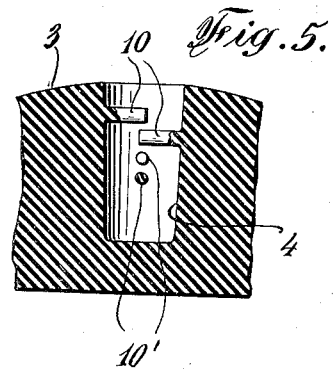
INVENTOR
Robert W. Simpson
BY Sheffield & Betts
HIS ATTORNEYS Patented Dec. 31, 1940

2,226,950

UNITED STATES PATENT OFFICE 2,226,950

FLOWER HOLDER

Robert W. Simpson, New York, N. Y.

Application January 13, 1938, Serial No. 184,756
In Great Britain November 15, 1937

8 Claims. (Cl. 47—41)

My invention relates to a flower holder which is particularly adapted for use in connection with the device for exhibiting flowers shown and described in my United States Letters Patent No. 2,046,854, issued July 7, 1936 (reissued March 9, 1937 as Reissue Letters Patent No. 20,289). The present invention, when so used, acts as a combined closure member and holder or support for the stems of the flowers to be exhibited; it may also act as the base upon which the flower exhibiting device of my said reissue patent stands.

Among the objects of my present invention is to provide a holder for flowers which will not deteriorate appreciably with repeated use; into which the flower stems may be quickly and conveniently inserted and positively held, and from which they may be easily withdrawn; which is economical to manufacture; and which, when used in connection with my above-mentioned flower exhibiting device, will perform one or more of the several functions above described. Other objects and advantages of my invention will appear hereinafter and will be appreciated by those skilled in the art to which it appertains.

In the drawing:

Figure 1 is a plan view of the preferred form of my present invention;

Fig. 2 is a perspective view thereof when used with my flower exhibiting device, certain parts being shown in section;

Fig. 3 is a cross section taken on the line a—a of Fig. 1;

Fig. 4 is a fragmentary view of a modified form of my device; and

Fig. 5 is a fragmentary cross section thereof, taken on the line b—b of Fig. 4.

Referring to the drawing, the device, 1, of my present invention, in its preferred form, comprises in general a cup-shaped member of soft, elastic rubber, molded in a single piece. An upwardly and inwardly turned flange, 2, is provided around its circumference; also, as an integral part thereof, there is provided a more or less spherical, solid protuberance, or central thickened portion, 3, having a plurality of holes or sockets, 4, molded therein for the purpose of holding the flower stems. The bottom of the device is preferably flat or may be provided with small knobs or posts, 5, upon which the device may stand.

One method of using my flower holder is shown in Fig. 2, where it performs the several functions of acting as a base member for a flower exhibiting device, acting as a closure member for the glass bowl of such device, and acting as the holder of the flowers to be exhibited therein. The general structure and principle of such a flower exhibiting device are shown and described in my said Reissue Patent No. 20,289. In such a device, the opening in an inverted glass bowl, 6, filled with water or other transparent liquid, is closed by a cup-shaped rubber member,—the liquid being retained in the bowl by means of a flange on the cup-shaped member, or by atmospheric pressure, or both. Flowers, or any other desired article, are exhibited within the glass bowl,—being supported by a holder associated with the base member.

Thus, utilizing my present invention, the flower stems are inserted in the holes or sockets, 4, so as to project upward into the liquid within the bowl, 6. The neck of the bowl rests on the flat surface, 7, of the combined closure member, base member, and flower holder, and the flange, 2, thereof engages the external surface of the neck of the bowl to retain the liquid therein.

Normally, means are provided within the sockets, 4, to engage the flower stems so that the flowers will not come out of the sockets and float in the liquid within the bowl. In the drawing, two forms of flower stem engaging means are illustrated. In the form shown in Figs. 1 and 3, the sockets, 4, are provided, near their open ends, with annular flanges, 8, similar to washers. These flanges are thin and, therefore, by reason of the softness and elasticity of the rubber of which the device is made, are pliable. When a flower stem (such as 9—see Fig. 3) is inserted in the sockets, the inner edge of the flange, 8, within the socket, is bent downward, in engagement with the flower stem, and thus prevents the flower stem from floating out of the socket. In view of the pliability of the thin flanges, 8, however, the flower stems may easily be removed when desired.

In the modification of the flower stem engaging means shown in Figs. 4 and 5, there are provided a plurality of pins or fingers, 10, 10' (preferably four of them), which likewise are molded integrally with the entire device and are therefore also composed of soft, elastic rubber. Preferably each finger extends from the wall of the socket to approximately the axis thereof. In the preferred arrangement of this modification, the second finger is located somewhat below the first and diametrically opposite thereto. The two remaining fingers, 10', are located below the fingers, 10, and are oriented 90° with respect thereto. With this arrangement, as will readily be seen, the flower stem, when inserted in the socket, will be engaged by the resilient fingers at a plurality of places. In view of their pliability, the fingers, when a flower stem is inserted in the socket, will be bent downward,—thereby holding the flower stem in the socket and preventing its coming out except when a comparatively large upward pull is exerted on the stem.

If desired, the socket may be tapered so as to become narrower toward the bottom, as shown in Fig. 5.

In its preferred form, the device of the present invention, as stated above, is molded from a single piece of soft, elastic rubber. In prior devices which have been constructed and designed for use with flower exhibiting devices such as the type illustrated in my said Reissue Patent No. 20,289, there have always been certain objectionable features. Thus, where metal springs of the type shown in my said reissue patent are used, it is sometimes difficult to insert flower stems in the stem engaging means without breaking the stems; also the repeated opening and closing of the springs often result in their losing their resiliency with the result that they are no longer suitable to hold flower stems. A number of other types of flower stem engaging means have also been designed, and some of them have been commercially used. Many of them are unsightly, others are difficult or inconvenient to use, and all of them, so far as I know, are more expensive to manufacture and assemble than the device of the present invention. The construction of a holder made entirely of soft, elastic rubber, molded in one piece, is not only of itself more covnenient and economical, but the resultant device is more convenient to handle and use. When the present invention is applied to a flower bowl such as shown in my above-mentioned reissue patent, the several operations of inserting the flower stems in the flower holder, inserting the flowers in the bowl, and closing the neck of the bowl are substantially simplified.

It will be understood that modifications may be made in the form and details of devices made according to my present invention, and I desire to secure protection for all such modifications as may come within the scope of the appended claims.

Having described my invention, I claim:

1. A flower holder comprising a comparatively thick and rigid central portion composed of molded soft rubber; flower-stem sockets therein; and integral, pliable, flower-stem engaging means in the form of annular flanges molded within the sockets.

2. A flower holder comprising a base portion of soft, elastic rubber having a thickened, comparatively rigid, central portion; cylindrical flower-stem sockets in the thickened portion; and integral, pliable flower-stem engaging means in the form of annular flanges associated with the sockets.

3. A device according to claim 6 in which the sockets are closed at the bottom.

4. A combined flower holder and closure member for an inverted, liquid-filled, display bowl comprising a thickened, comparatively rigid, central portion and an upstanding flange around the periphery of such member, the central portion and flange being joined together by pliable, resilient material; sockets in the said central portion; and pliable means for engaging an article to be displayed within said bowl, said means being composed of annular flanges located adjacent the mouths of the sockets.

5. A device according to claim 4 in which the sockets are closed at the bottom.

6. A flower holder comprising a comparatively thick and rigid central portion composed of soft rubber; flower-stem sockets therein; and pliable flower-stem engaging means associated with the sockets, said means being in the form of annular flanges.

7. A device according to claim 6 in which the flower-stem engaging means are located within the sockets adjacent their mouths.

8. A combined flower holder and closure member for an inverted, liquid-filled, flower-display bowl comprising a base portion; an integral, upstanding flange around the periphery thereof and adapted to engage the neck of the bowl; a thickened central portion; flower-stem sockets therein; and pliable flower-stem engaging means in the form of annular flanges adjacent the mouths of the sockets; all of said portions being composed of soft, elastic rubber, molded in one piece.

ROBERT W. SIMPSON.